United States Patent
Buts et al.

(10) Patent No.: US 12,399,972 B2
(45) Date of Patent: Aug. 26, 2025

(54) IMAGE-BASED LOGIN AND AUTHENTICATION

(71) Applicant: JPMorgan Chase Bank, N.A., New York, NY (US)

(72) Inventors: Alexander Buts, Jersey City, NJ (US); Ta-Wei Chen, Princeton Junction, NY (US); Robert S Newnam, Wilmington, DE (US); Benjamin H Sansom, Little Elm, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 208 days.

(21) Appl. No.: 18/233,281

(22) Filed: Aug. 11, 2023

(65) Prior Publication Data

US 2024/0070254 A1 Feb. 29, 2024

Related U.S. Application Data

(60) Provisional application No. 63/401,958, filed on Aug. 29, 2022.

(51) Int. Cl.
*G06F 21/36* (2013.01)
*H04L 9/32* (2006.01)

(52) U.S. Cl.
CPC ............ *G06F 21/36* (2013.01); *H04L 9/3213* (2013.01); *H04L 9/3236* (2013.01)

(58) Field of Classification Search
CPC ...... G06F 21/36; H04L 9/3213; H04L 9/3236
See application file for complete search history.

(56) References Cited

U.S. PATENT DOCUMENTS 8,370,926 B1 * 2/2013 Satish ..................... G06F 21/36
726/19
8,392,975 B1 * 3/2013 Raghunath .............. G06F 21/36
726/19

(Continued)

FOREIGN PATENT DOCUMENTS

CN 114782238 A 7/2022

OTHER PUBLICATIONS

International Search Report and Written Opinion of the International Searching Authority issued in International Application No. PCT/US2023/030572, dated Apr. 17, 2024.

*Primary Examiner* — Techane Gergiso
(74) *Attorney, Agent, or Firm* — Greenblum & Bernstein, P.L.C.

(57) ABSTRACT

Implementations generally relate to an image-based login and authentication system. In some implementations, a method includes displaying a plurality of random images to a user and receiving from the user a selection of at least one target image from the plurality of random images. The method further includes generating a hash number for the at least one target image, where the hash number identifies the at least one target image, and concealing the hash number in the at least one target image, where the concealing of the hash number provides security in an authentication of the at least one target image. The method further includes generating an encrypted identification token, where the encrypted identification token includes the hash number. The method further includes associating the encrypted identification token with the user, and storing the encrypted identification token in a database for authentication of at least one target image and the user.

20 Claims, 13 Drawing Sheets

(56) References Cited

U.S. PATENT DOCUMENTS

| | | | | |
|---|---|---|---|---|
| RE47,518 E * | 7/2019 | Kowalczyk | ............. | G06F 21/31 |
| 10,482,225 B1 * | 11/2019 | Abdulhayoglu | ........ | G06F 21/31 |
| 10,848,482 B1 | 11/2020 | Eisen et al. | | |
| 10,885,176 B2 * | 1/2021 | Whitney | ................. | G06F 21/36 |
| 11,177,963 B2 * | 11/2021 | Famechon | ............... | H04L 9/30 |
| 2005/0283609 A1 * | 12/2005 | Langford | ............... | G06F 21/64 |
| | | | | 713/176 |
| 2007/0074119 A1 * | 3/2007 | Komine | ................. | G06F 21/36 |
| | | | | 715/743 |
| 2008/0168546 A1 | 7/2008 | Almeida | | |
| 2010/0043062 A1 * | 2/2010 | Alexander | ............ | H04L 9/3226 |
| | | | | 726/6 |
| 2013/0097697 A1 * | 4/2013 | Zhu | ...................... | H04L 63/083 |
| | | | | 726/18 |
| 2014/0201536 A1 * | 7/2014 | Fiske | ................... | H04L 9/0844 |
| | | | | 726/18 |
| 2014/0372754 A1 * | 12/2014 | Aissi | .................... | H04L 9/0861 |
| | | | | 713/168 |
| 2015/0012988 A1 * | 1/2015 | Jeng | ................... | H04L 63/0838 |
| | | | | 726/7 |
| 2016/0253510 A1 * | 9/2016 | Lim | ...................... | G06F 21/335 |
| | | | | 726/30 |
| 2018/0124034 A1 * | 5/2018 | Duvall | .................. | H04L 9/3236 |
| 2018/0331833 A1 * | 11/2018 | Tomlinson | ............ | H04L 9/3242 |
| 2020/0151431 A1 * | 5/2020 | Hassan | ................ | G06V 40/172 |
| 2020/0184052 A1 * | 6/2020 | Ellison | .................... | G06F 21/36 |
| 2020/0372145 A1 * | 11/2020 | Cramer | .................. | G06F 21/46 |

* cited by examiner

IMAGE-BASED LOGIN AND AUTHENTICATION

BACKGROUND

Access to systems typically involves user login and authentication for security. For example, to access or log into a system, a user typically enters a username and password. The system then authenticates the identity of the user by verifying the username and password. If the system verifies the username/password combination, the system gives the user access to the system. Otherwise, the system denies access.

DETAILED DESCRIPTION

Figure 1:
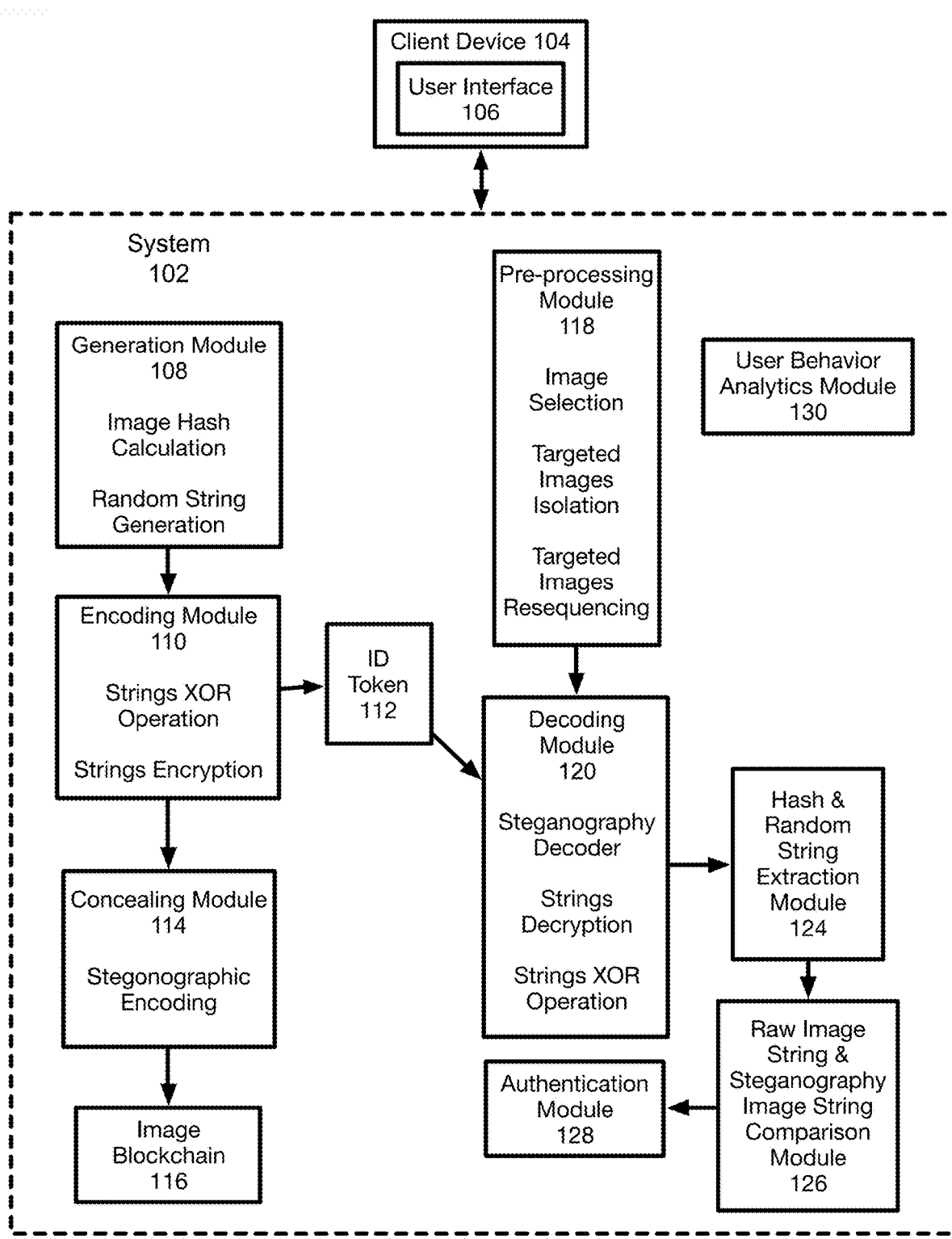
FIG. 1 is a block diagram of an example environment for providing image-based login and authentication, which may be used for implementations described herein.

Implementations described herein enable, facilitate, and manage an image-based login and authentication system. Traditional username/password combinations are becoming less secure and less reliable for user authentication. Increased requirements for passwords introduce user frustration and potential avenues for brute-force attacks versus more complex approaches such as pass phrases, two-factor authentication, or other means.

Implementations described herein address these issues and provide various other benefits. For example, in various implementations, a system enables a user to log into an account and authenticates the user's identity using target images that the user selects upon login. The target images are embedded with hash numbers and random numbers using steganography. When selected by the user via use of sensory cues (such as visual cues, auditory cues, etc.), the system authenticates the images and thereby authenticates the user's identity. The system enables an ability for a user to log in and to be authenticated via a simple user interface in a low-observable manner while providing enhanced security. As such, the user need not remember a long, complicated password, but may instead simply recognize in a natural manner target images presented during login and authentication.

As described in more detail herein, in various implementations, a system displays various random images to a user and subsequently receives from the user a selection of target images and decoy images from the random images. For each target image, the system generates a hash number and a random number, where each hash number identifies a unique target image. The system conceals each hash number and random number along with a random number in a corresponding target image using steganography. The concealing of the hash numbers and random numbers provide security in the authentication of the target images. In some implementations, decoy images are not embedded with hash numbers and random numbers. In some implementations, the system may generate a hash number and a random number for at least one decoy image and embedded these hash and random numbers in the decoy image. This also ensures that images that the user selects during authentication are not fake. The system generates an encrypted identification token that incorporates a string of the hash numbers and random numbers of the target images. In some implementations, the system may encrypt the token, and store the token on at least one hardware or software-based security device to enhance security. The system may further employ data concealing techniques to obfuscate the token. In various implementations, the encrypted identification token may be generated in a blockchain for further increased security. For example, the system may create an image blockchain linking at least one target image to create an immutable image ledger to enhance security. The system associates the encrypted identification token with the user, stores the encrypted identification token in a database for authentication of at least one target image and the user.

As described in more detail herein, when the user logs into a given account, the user selects the target images from a set of authentication images, which include the target images, decoy images, and random filler images. The system enables the user to make such selections based on a variety of methods, including non-contact means such as eye gaze movements. The system authenticates the user by authenticating the user-selected target images. The system retrieves the encrypted identification token associated with the user from the database and authenticates the string of user-selected target images based on the encrypted identification token. The system authenticates the user based on authentication of the user-selected target images. Various implementations are directed to setting up the image-based login and authentication, subsequently authenticating the user-selected target images, and ultimately the user, are described in more detail herein.

FIG. 1 is a block diagram of an example environment 100 for providing image-based login and authentication, which may be used for implementations described herein. As shown, environment 100 includes a system 102, which communicates with a client device 104 of a user. The user interacts with system 102 for login and authentication via user interface 106.

As shown, system 102 includes a generation module 108 that performs image hash calculations for target images selected by a user and performs random string generation for the target images for additional security. System 102 also includes an encoding module 110 that performs exclusive OR (XOR) logical operations on a string's encryption to generate a security or identification (ID) token 112 based on a hash number and random number produced by generation module 108. Encryption may include classical or quantum encryption techniques.

Encoding module 110 stores encrypted identification token 112 in a database (not shown) for subsequent authentication of the target images. System 102 also includes a concealing module 114 that performs steganographic encoding of the encrypted strings contained encrypted identification token 112 in their respective target images. System 102 may store the target images in an image blockchain 116 for additional security, to ensure a higher level of security and resistance to the forgery of images. Various implementations directed to operations of generation module 108, encoding module 110, and concealing module 114 are described in more detail herein.

System 102 also includes a pre-processing module 118 that proves a set of target images, decoy images, and random filler images for a user to select for authentication. Pre-processing module 118 isolates the selected target images and re-sequences the target images for decoding. A decoding module 120 of system 102 retrieves the encrypted identification token 112 from a database, performs steganography decoding of the target images, performs strings decryption, and performs strings XOR operations on the selected target images. A hash and random string extraction module 124 extracts hash numbers and random numbers from the target images. A raw image string and steganography image string comparison module 126 compares the extracted hash numbers and random numbers of the target images selected by the user to hash numbers and random numbers of the encrypted identification token 112. Authentication module 128 authenticates the target images selected by the user in order to authenticate the user's identity. Various implementations directed to operations of pre-processing module 118, decoding module 120, hash and random string extraction module 124, and raw image string and steganography image string comparison module 126, and authentication module 128 are described in more detail herein.

System 102 also includes a user behavior analytics module 130 that analyzes user selection of images during authentication events over time. In various implementations, user behavior analytics module 130 may use artificial intelligence (AI) and/or machine learning (ML) to determine patterns of selection whenever the user selects target images and decoy images during future authentication after initial setup. The system may apply machine learning on biotelemetry data for user behavior analytics that generate a dynamic user profile score which can be used to improve the authentication process. For example, the system may use biotelemetry data to track, record, and characterize eye movement patterns of a user as the user gazes at a series of target and decoy images. In some implementations, upon learning a user's natural patterns for selecting target images and decoy images during login and authentication, the system may also determine when somethings is awry if the system detects that the user deviates from the user's normal gaze patterns. This may be a case, for example, involving an external bad actor forcing the user to login under duress. The user may, for example, intentionally break the user's typical pattern to signal to the system that something is wrong. Such detections may occur in connection with a personal threat or for some other reason such as a medical emergency.

Environment 100 may not have all of the components shown and/or may have other elements including other types of elements instead of, or in addition to, those shown herein. While system 102 performs implementations described herein, in other implementations, any suitable component or combination of components associated with system 102 or any suitable processor or processors associated with system 102 may facilitate performing the implementations described herein.

Figure 2:
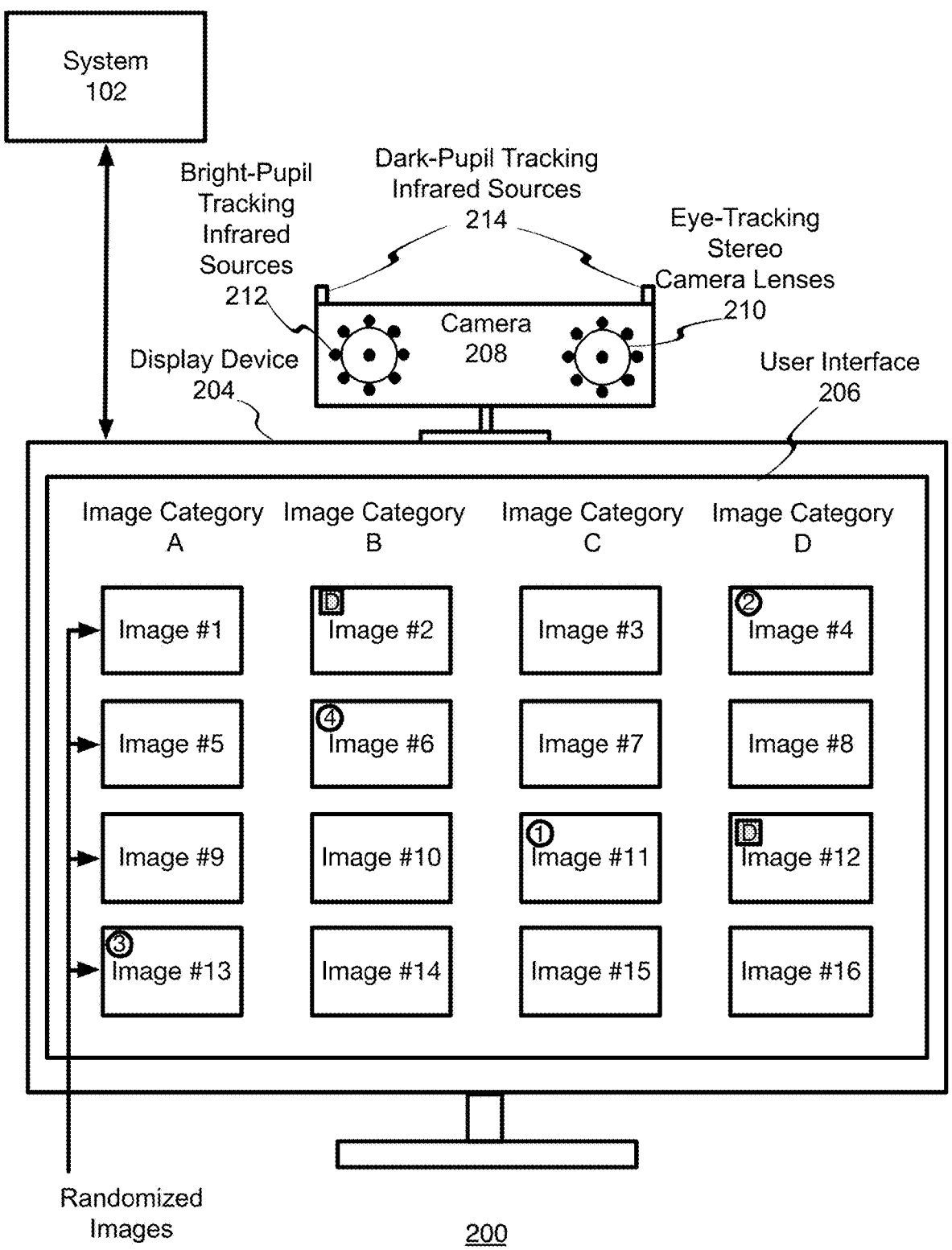
FIG. 2 is a block diagram of an example environment including a user interface for providing image-based login and authentication, which may be used for implementations described herein.

FIG. 2 is a block diagram of an example environment 200 including a user interface for providing image-based login and authentication, which may be used for implementations described herein. Shown is system 102 of FIG. 1, which communicates with a display device 204 that displays a user interface 206. A camera 208 that includes eye-tracking stereo camera lenses 210, bright-pupil tracking infrared sources 212, and dark-pupil tracking infrared sources 214. System 102 uses camera 208 to track the gaze of a user as the user looks at various randomized images provided by system 102. In various implementations, camera 208 tracks the user's eye patterns or motion while directing their eyes to the appropriate images.

In some implementations, changes in pupil dilation may provide an externally observable physical indictor in the object recognition process. In some implementations, unconscious changes, controlled via sympathetic nervous system, may be attributed to the inter-operation between visual processing and memory recall. By tracking the eye movement and changes in pupil dilation, the system may identify on-screen images selected by the user. To properly perform eye and gaze tracking, the system may perform calibrations using a set of predefined points on the screen as required. For eye tracking, the system may also use standard pupil center corneal reflection (PCCR) techniques in which the reflections from pupil and cornea are monitored.

In various implementation, system 102 arranges the random images in various image categories (labeled Image Category A, Category B, Category C, and Category D). Example categories my include animals, plants, cars, symbols, and various other types of objects. In some implementations, pictures may also be of different graphical patterns. This may aid those with other visual impairments such as color blindness or ocular degenerative diseases. Any camera system may use spatial recognition and/or spatial anchoring, or any other method to perform eye or other tracking to ensure valid selection. The number of categories and types of categories may vary, and will depend on the particular implementation. As described in more detail herein, the user selects target images from among a set of random images (labeled Image #1 through Image #16).

The images may include high-resolution pictures in a variety of formats (e.g., jpg, gif, etc.). In various example implementations described herein, the user selects both target images and decoy images. In the example implementation shown and others described herein, the selected target images are indicated by circled numbers, and the selected decoy images are indicated by a boxed letter D. Use of the selected images for authentication are described in more detail below in connection with FIG. 3, for example.

Figure 3:
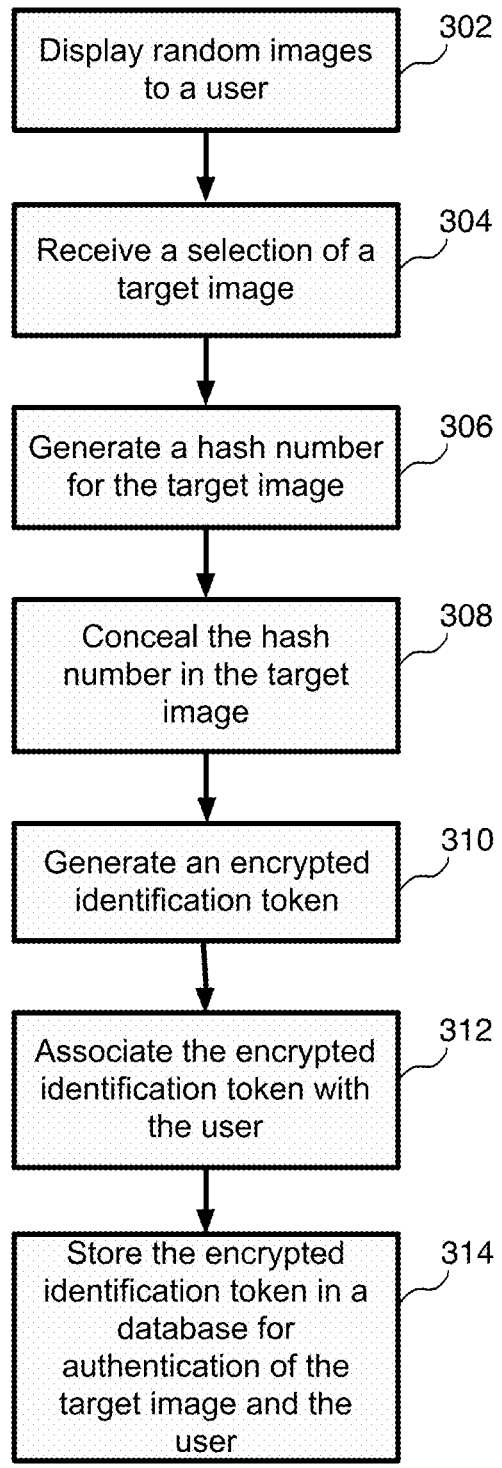
FIG. 3 is an example flow diagram for image-based login and authentication, according to some implementations.

FIG. 3 is an example flow diagram for image-based login and authentication, according to some implementations. Referring to both FIGS. 2 and 3, a method is initiated at block 302, where a system such as system 102 displays random images (e.g., Image #1 through Image #16) to a user.

At block 304, the system receives from the user a selection of one or more target images from the set of random images. As indicated above, the selected target images are indicated by circled numbers (e.g., circled numbers 1 to 4 corresponding to respective Image #11, Image #4, Image #13, and Image #6), and the selected decoy images are indicated by a boxed letter D (e.g., Image #2 and Image #12).

In various implementations, the system transfers the selected images into a graph data structure. In some implementations, the system may store the selected images in an undirected graph, with no particular order of selected images. In some implementations, the system may store the selected images in a directed graph, with a particular order of selected images (e.g., the order in which the images were originally selected). As described in more detail herein, by storing the selected images in a directed graph with a particular order, the system may provide enhanced security.

At block 306, the system generates a hash number for each of the one or more target images. In various implementations, the hash numbers identify the respective target images. In the example associated with FIG. 2, the user selects multiple target images. As such, system 102 generates a hash number for each selected target image and stores the hash numbers in a database. For added security, system 102 may also generate random numbers and combine the random numbers with respective hash number, example implementations of which are described in more detail herein.

At block 308, the system conceals the hash numbers in the respective target images. In various implementations, the hash numbers may be in the form of steganography text in the metadata of the target images. In various implementations, the concealing of the hash number for each target image provides security in an authentication of the target images. Additional example implementations directed to concealing hash numbers are described below, in connection with FIG. 4, for example.

At block 310, the system generates an encrypted identification token, where the encrypted identification token includes the hash number. In implementations where the system also generates random numbers, the system includes the random numbers in the encrypted identification token.

At block 312, the system associates the encrypted identification token with the user. In various implementations, while a given hash number identifies a corresponding target image, the encrypted identification token identifies the user.

At block 314, the system stores the encrypted identification token in a database for authentication of one or more target images and ultimately authentication of the user. As described in more detail herein, the system retrieves the encrypted identification token when the user logs into the system, matches hash numbers and optionally random numbers embedded in images that a user selects from a set of authentication images to corresponding hash numbers and random numbers in the encrypted identification token.

In some implementations, after initial set up, when the user logs in, the system may validate the user if the user selects the correct set of images from a group of images, as described herein. The system may validate the user after selecting the images randomly or in any particular order, as long as the correct set of images are selected for validation. For enhance security, in some implementations, the system may require that the user select not only the same set of originally selected images but may also strictly enforce and require that the user select the same set of originally selected images in the same order as originally selected. This would provide a higher level or enhanced level of security, as the set of images would need to be in a particular order.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
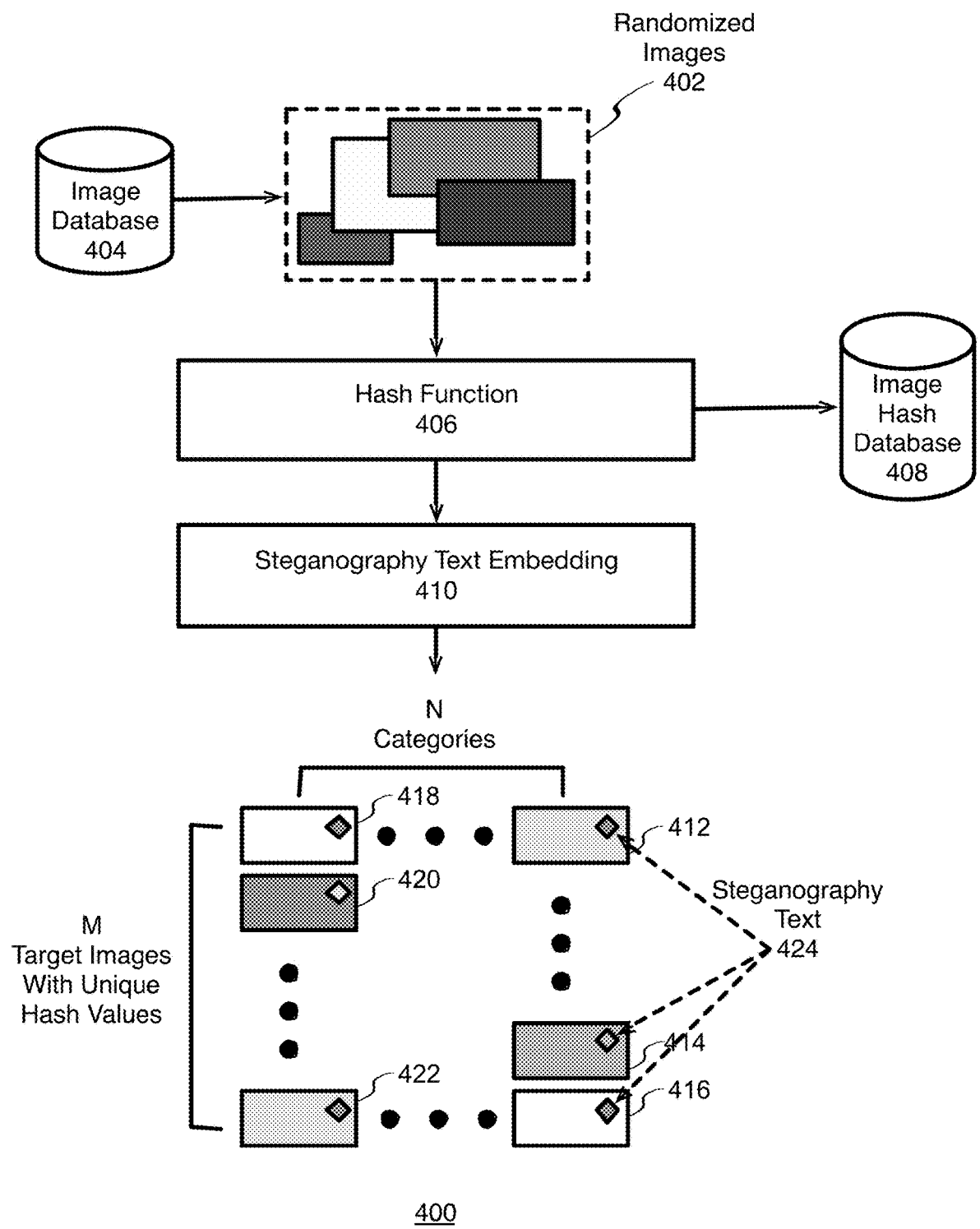
FIG. 4 is a block diagram of an example scenario, where steganography is used to conceal hash numbers in target images, according to some implementations.

FIG. 4 is a block diagram of an example scenario 400, where steganography is used to conceal hash numbers in target images, according to some implementations. As shown, the system retrieves randomized images 402 from an image database 404. The system displays the random images in a user interface (e.g., user interface 206 that of FIG. 2). The system uses a generation module to apply a hash function 406 to user-selected target images in order to generate respective hash numbers. Each resulting hash number identifies a unique target image. The system then stores the hash numbers in an image hash database 408.

In various implementations, the system performs steganography text embedding 410 to conceal hash numbers in respective target images. This results in M target images with unique hash numbers or values. For example, images 412, 414, 416, 418, 420, and 422 each include steganography text 424 in its metadata, collectively. The steganography text, which includes the hash numbers, are indicated by diamond symbols in each image 412 to 422 shown. In various implementations, the target images may be in any one or more categories, which will depend on user's choices.

Figure 5A:
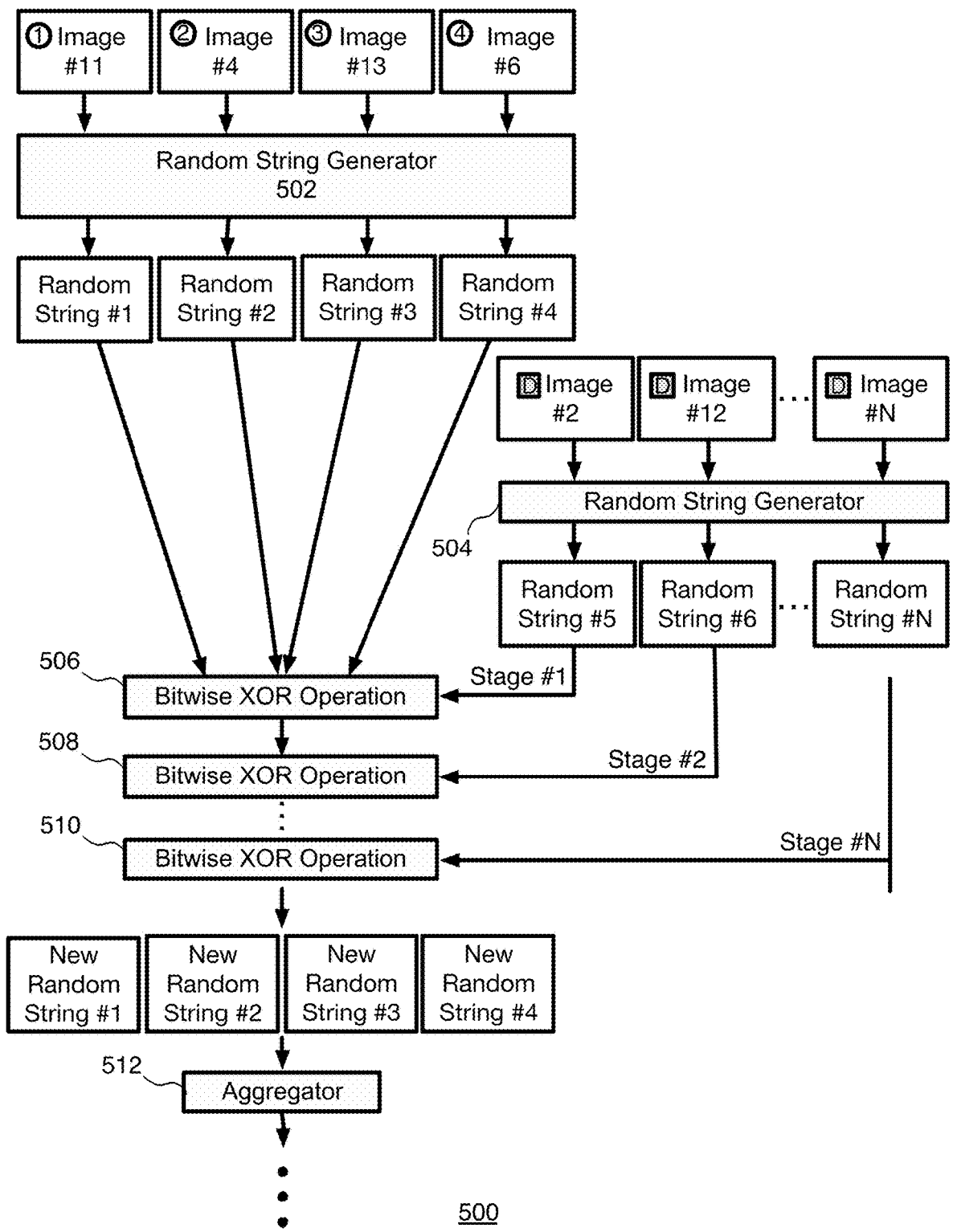
FIGS. 5A and 5B show a block diagram of example scenario, where the system generates random numbers or strings that are embedded with corresponding hash numbers in target images for addition security during authentication, according to some implementations.
Figure 5B:
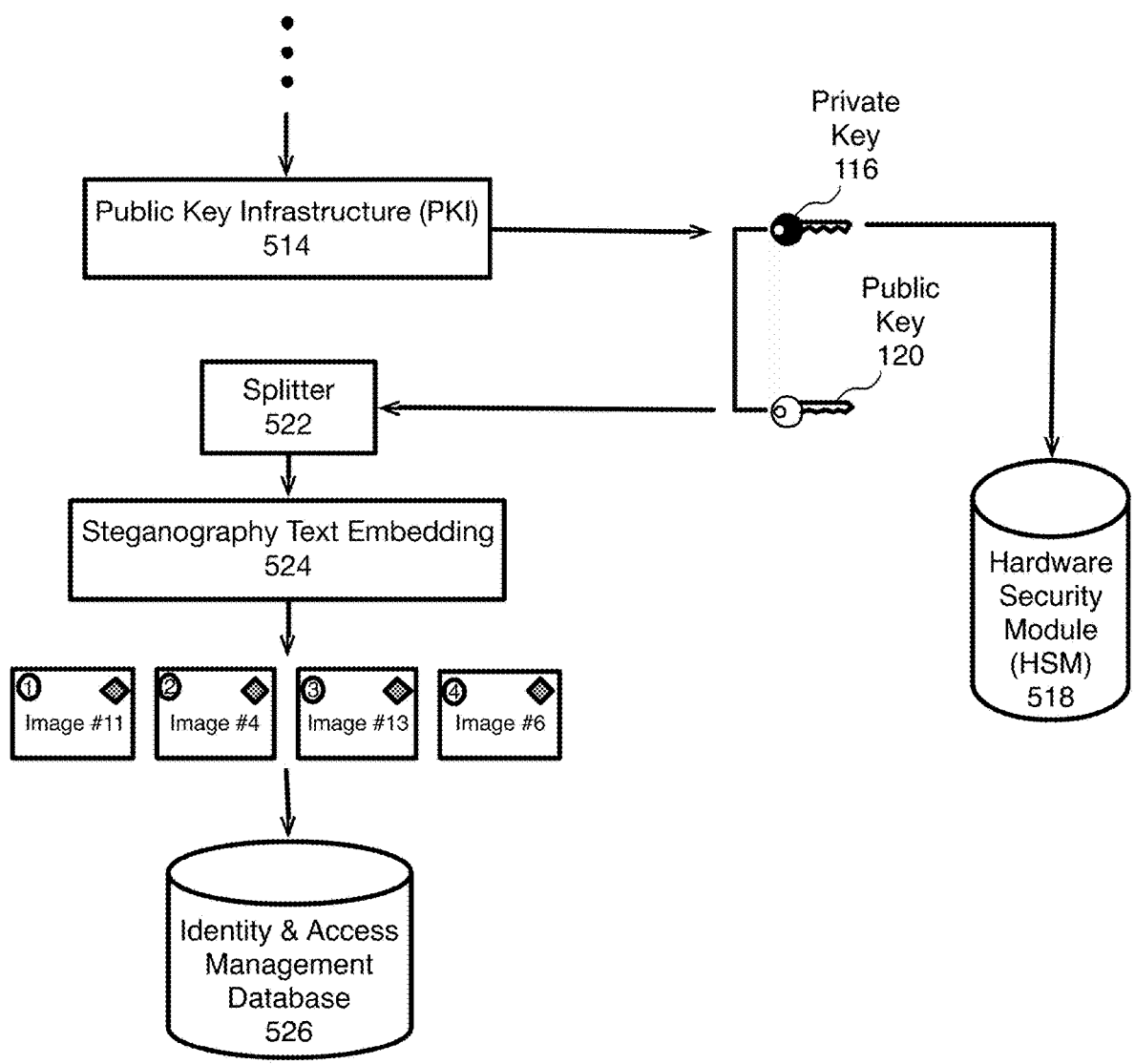

FIGS. 5A and 5B show a block diagram of example scenario 500, where the system generates random numbers or strings that are embedded with corresponding hash numbers in target images for addition security during authentication, according to some implementations. Referring to FIG. 5A, shown are four user-selected images (e.g., Image #11, Image #4, Image #13, Image #6). The system uses a random string generator 502 to generate random strings (e.g., Random Strings #1 to #4) corresponding to the user-selected images. As shown, the system generates a random number for each target image. In various implementations, a combination of the random number and the hash number identifies the at least one target image. In some implementations, the system may also use a random string generator 504 to generate random numbers or strings (e.g., Random String #5, Random String #6, Random String N, etc.) to respective user-selected decoy images (e.g., Image #2, Image #12, Image N, etc.).

In various implementations, the system performs bitwise XOR operations 506, 508, and 510 in stages (e.g., Stage #1, Stage #2, Stage #N, etc.). This results in new random numbers or strings (e.g., New Random String #1, New Random String #2, New Random String #3, New Random String #4, etc.). The system may use an aggregator 512 to aggregate the new random strings.

Referring to FIG. 5B, the system uses public key infrastructure (PKI) tools or techniques 514 to generate a private key 116 stored in hardware security module (HSM) 518 and a public key 120. In various implementations, the system applies a splitter 522 and steganography text embedding 524 to conceal the random numbers in the target images. The system stores the target images (e.g., Image #11, Image #4, Image #13, Image #6, etc.) in an identity and access management database 526 for subsequent or future login and authentication events. In various implementations, the system generates for each target image, an encrypted identification token that includes an associated hash number and random number. The concealing of the random numbers in combination with the concealing of hash numbers increases the security in the authentication of the target images.

As indicated above, in various implementations, the system may also receive a user selection of one or more decoy images from the random images presented. As described in more detail below, the decoy images are grouped with the target images in the authentication of the target image, and where the one or more decoy images increase the security in the authentication of the at least one target image.

Figure 6:
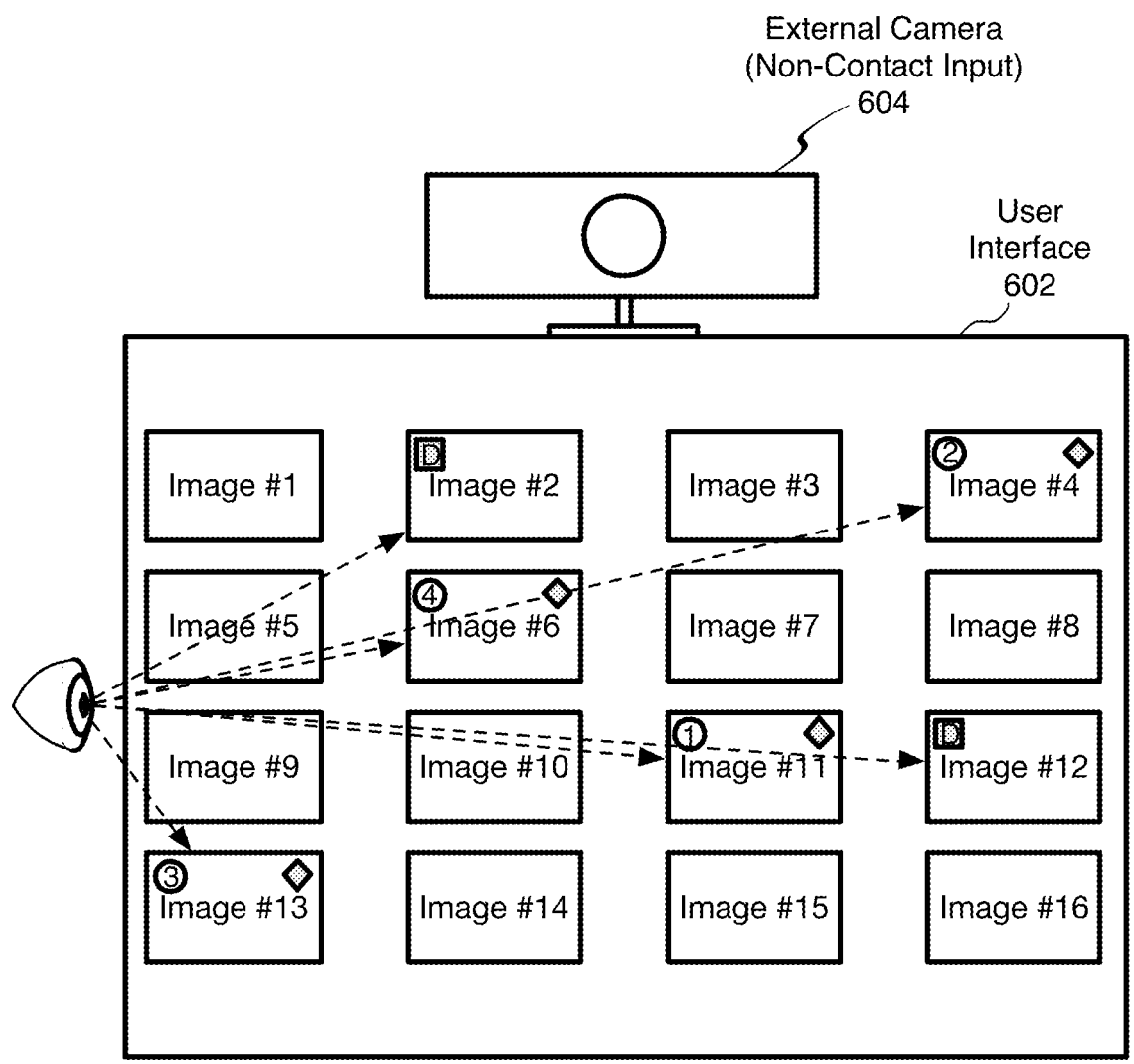
FIG. 6 is an example environment involving non-contact input for user selection of images for authentication, according to some implementations.

FIG. 6 is an example environment 600 involving non-contact input for user selection of images for authentication, according to some implementations. Shown is a user interface 602 and an external camera 604 for tracking the gaze of the user. In various implementations, during the authentication of the target images, the system presents a group of authentication images to the user, where the group of authentication images includes the target images, the decoy images, and multiple filler images. These are from the set of random images from which the user selected for target images. As shown, the user looks at or gazes at the target images (e.g., Image #4, Image #6, Image #11, and Image #13). The user also gazes at the decoy images (e.g., Image #2 and Image #12). The system receives the user selection of the target images from the group of authentication images, as well as the decoy images. This makes it difficult for a stranger or shoulder surfer to determine which images are the target images.

Figure 7:
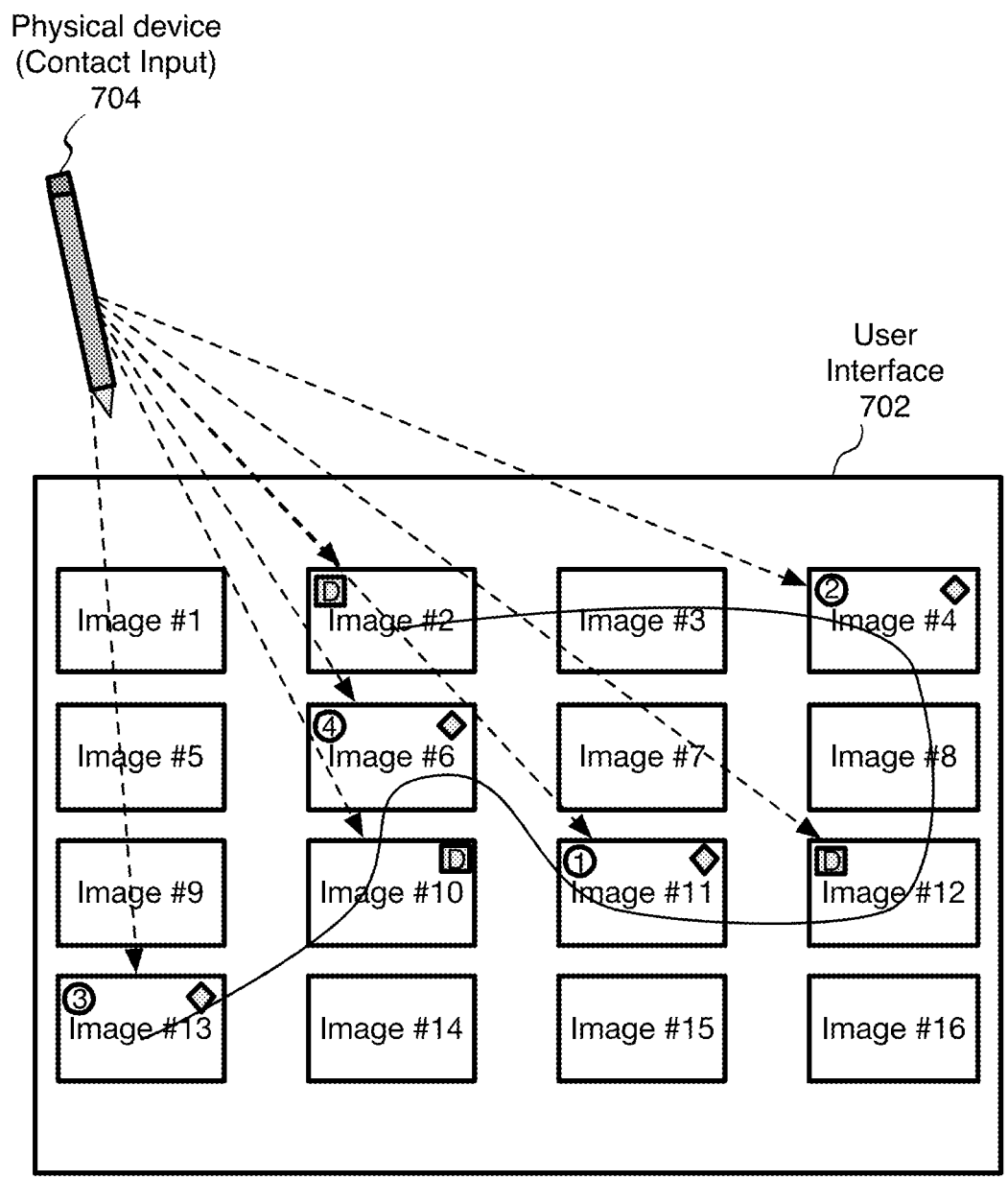
FIG. 7 is an example environment involving contact input for user selection of images for authentication, according to some implementations.

FIG. 7 is an example environment 700 involving contact input for user selection of images for authentication, according to some implementations. Shown is a user interface 702 and a physical device 704 for selecting images from a set of displayed authentication images for authentication. In this example, the user uses physical device 704 to select authentication images. Physical device 704 in this example, is a touch screen pen. Shown is curved line that represents a path that physical device 704 takes as the user makes contact with each target image and each decoy image. The authentication images selected target images in this example are the same as those in the example of FIG. 6. In some implementations, the user may also swipe a finger across the touchscreen on a path such that the finger contacts the target images and decoy images in order to select those authentication images.

Figure 8:
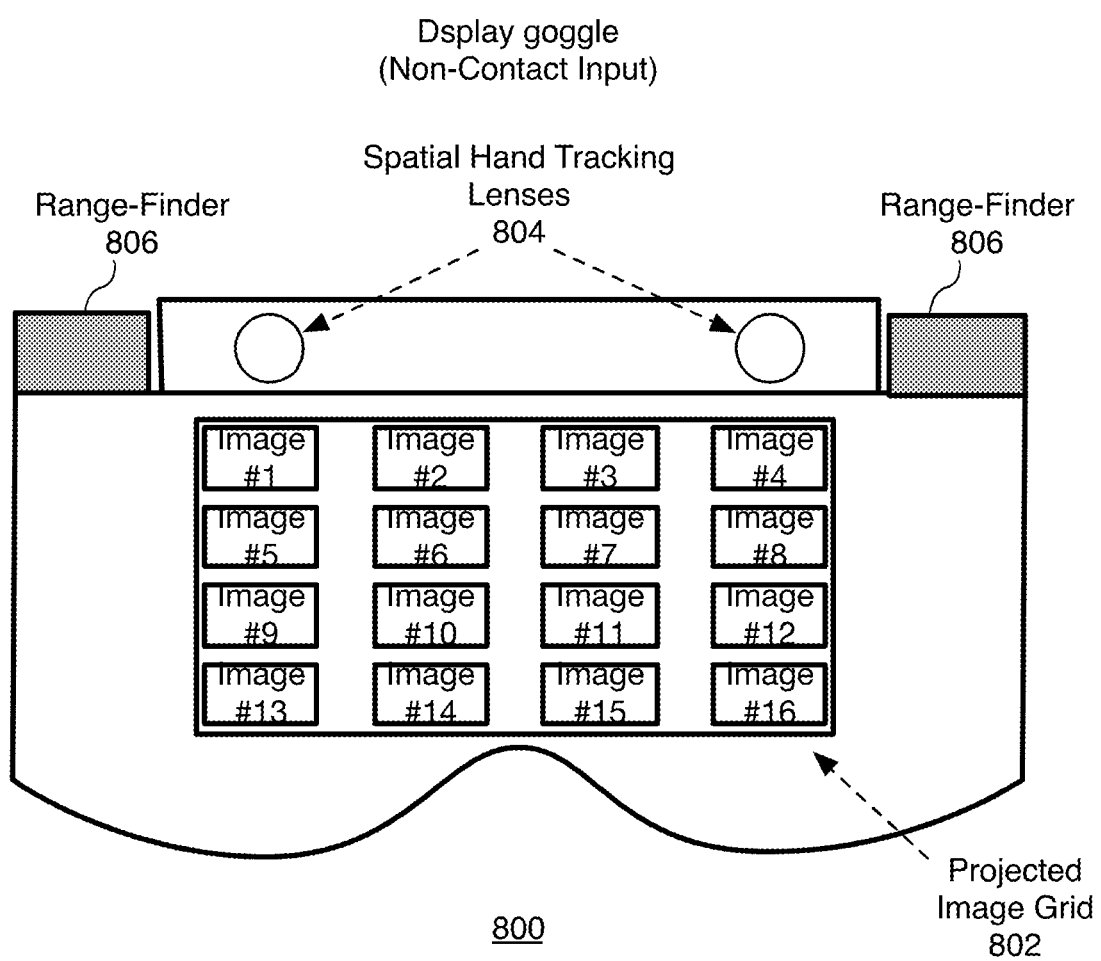
FIG. 8 shows example display goggles involving non-contact input for a user selection of images for authentication, according to some implementations.

FIG. 8 shows example display goggles 800 involving non-contact input for a user selection of images for authentication, according to some implementations. In this example, an image grid 802 is projected on display goggles 800. Also shown are spatial hand tracking lenses 804 and range-finders 806. In various implementations, the system determines with the spatial hand tracking lenses and range-finders 806 where the user gestures to select target images. In some implementations, the system may also detect the gaze of the user as the user selects target images from among the group of images.

Figure 9A:
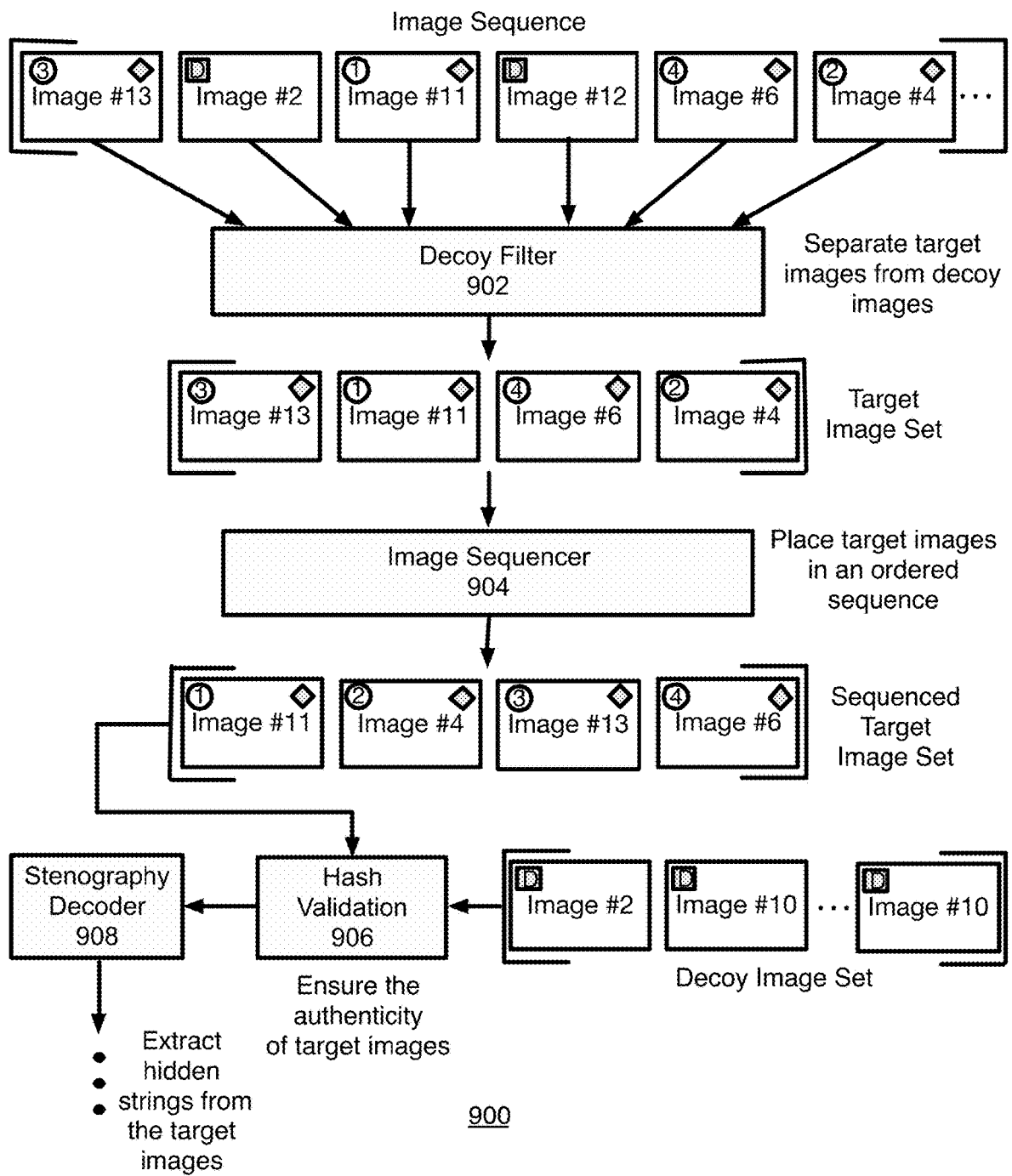
FIGS. 9A and 9B show a block diagram of an example scenario, where the system receives an image sequence selected by a user during authentication, according to some implementations.
Figure 9B:
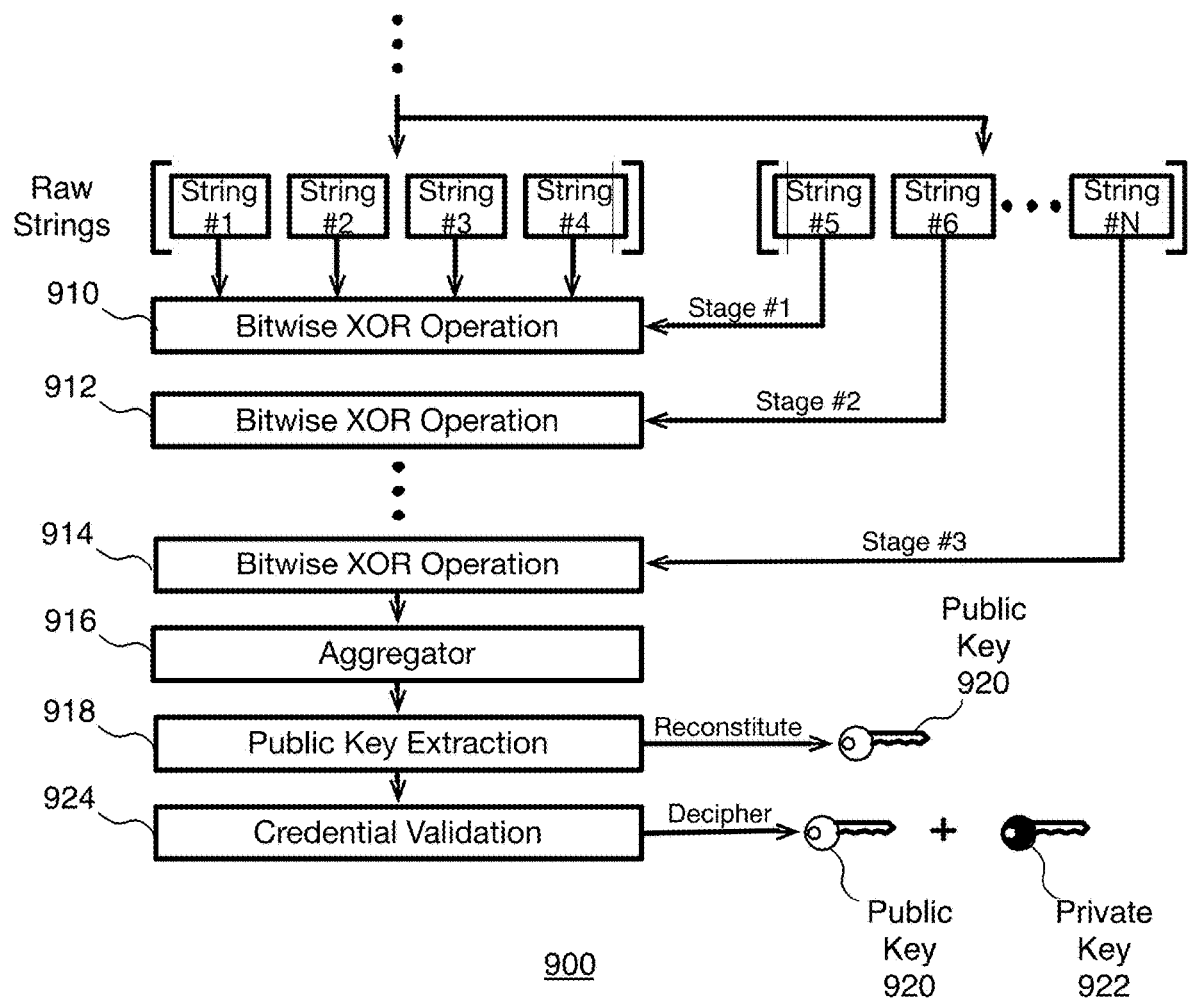

FIGS. 9A and 9B show a block diagram of an example scenario 900, where the system receives an image sequence selected by a user during authentication, according to some implementations. Referring to FIG. 9A, shown is an image sequence including both target images (e.g., Image #13, Image #11, Image #6, and Image #4) and decoy images (e.g., Image #2 and Image #12). As shown, the system uses a decoy filter 902 to separate target images from the decoy images. This results in a target image set (e.g., Image #13, Image #11, Image #6, and Image #4). In various implementations, the user may select the target images and decoy images in any order. They system uses an image sequencer 904 to place the target images in an order sequence. The ordered sequence corresponds to the ordered sequence of the original target images that was established by the user during the initial set up.

The system then performs a hash validation 906 to ensure authenticity of the target images. In some implementation, the system may also optionally perform a hash validation of decoy images if the decoy images also contain hash numbers. In various implementations, it may be option that the decoy images also contain respective hash numbers. The system uses a steganographic decoder 908 to extract hidden or concealed strings from the target images.

Referring to FIG. 9B, shown are extracted, raw strings from both target images (e.g., String #1, String #2, String #3, String #4) and decoy images (e.g., String #5, String #6, String #N). In various implementations, the system performs bitwise XOR operations 910, 912, and 914 in stages (e.g., Stage #1, Stage #2, Stage #3, etc.). The system uses an aggregator 916 to aggregate the strings, and performs a public key extraction 918 to reconstitute a public key 920.

The system then performs credential validation 924 to decipher the public key 920 and a private key 922. In various implementations, the system retrieves the encrypted identification token from the database, and authenticates the target images based on the encrypted identification token. For example, the system matches the strings from the authentication images selected by the user to the strings of the encrypted identification token fetched from the database. If the system successfully authenticates the user-selected images, the system also authenticates the user based on the authenticating of the target images.

As indicated above, the user need not select the target images and decoy images from the present set of authentication images in a particular order. This is because the system may automatically re-sequence the selected images without user invention. In some implementations, the system may require that the user select at least the target images in the same order that the user initially selected target images for future authentication. This may be a scenario where higher security is desired (e.g., logging into a bank account, etc.). As such, in various implementations, authentication of the set of target images selected by the user is based on a predetermined sequence of the target images in the set.

As indicated above, in various implementations, the target images include the target images selected by the user, and may be selected based on non-touch selection techniques. In some implementations, the system may enable a user to make selections based on sound. For example, the system may embed text including a hash number or a hash number combined with random number(s) in a music file. This provides more options for accessing a particular account.

In some implementations, the system may enable users with visual impairment to listen to a picture's description, provided through picture metadata to provide text-to-speech or other visual aid or application to provide a variety of login experiences. For example, the system may utilize any suitable natural speech techniques for auditory interaction with the system during authentication.

Implementations described herein provide various benefits. For example, implementations enable a user to log in to a system using image-based authentication. Implementations provide a variety of techniques for selecting target images and decoy images (e.g., by tracking eye gaze, by tracker hand or finger gestures). These selection techniques provide a simple and natural way for a user to log into a system and get authenticated. Implementations provide multitiered security for passcodes using images using stenographic embedding of encrypted hash numbers and random numbers in target images that are personal to the user.

Figure 10:
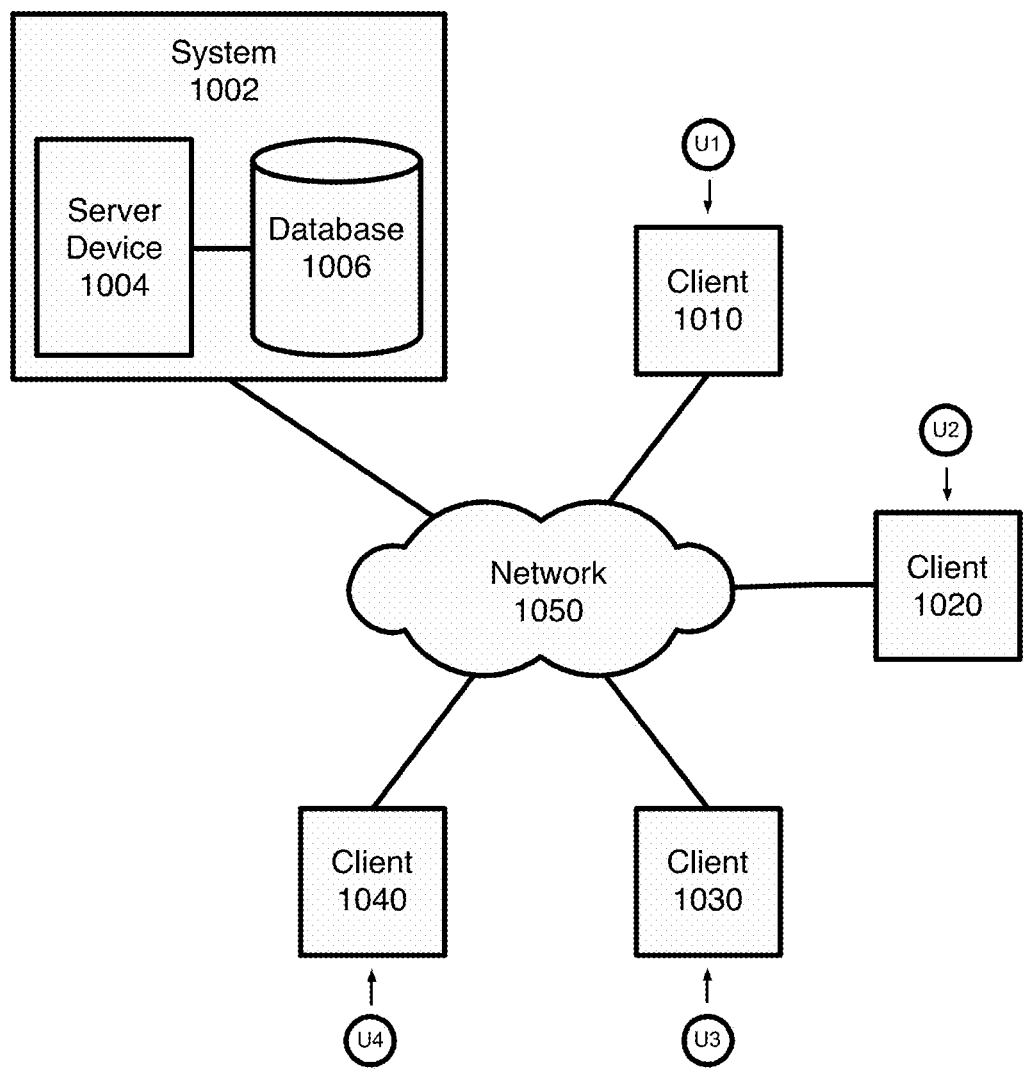
FIG. 10 is a block diagram of an example network environment, which may be used for some implementations described herein.

FIG. 10 is a block diagram of an example network environment 1000, which may be used for some implementations described herein. In some implementations, network environment 1000 includes a system 1002, which includes a server device 1004 and a database 1006. For example, system 1002 may be used to implement system 102 of FIG. 1, as well as to perform implementations described herein. Network environment 1000 also includes client devices 1010, 1020, 1030, and 1040, which may communicate with system 1002 and/or may communicate with each other directly or via system 1002. Client devices 1010, 1020, 1030, and 1040 may represent multiple users who log onto the system using login and authentication implementations described herein. Network environment 1000 also includes a network 1050 through which system 1002 and client devices 1010, 1020, 1030, and 1040 communicate. Network 1050 may be any suitable communication network such as a Wi-Fi network, Bluetooth network, the Internet, etc.

For ease of illustration, FIG. 10 shows one block for each of system 1002, server device 1004, and network database 1006, and shows four blocks for client devices 1010, 1020, 1030, and 1040. Blocks 1002, 1004, and 1006 may represent multiple systems, server devices, and network databases. Also, there may be any number of client devices. In other implementations, environment 1000 may not have all of the components shown and/or may have other elements including other types of elements instead of, or in addition to, those shown herein.

While server device 1004 of system 1002 performs implementations described herein, in other implementations, any suitable component or combination of components associated with system 1002 or any suitable processor or processors associated with system 1002 may facilitate performing the implementations described herein.

In the various implementations described herein, a processor of system 1002 and/or a processor of any client device 1010, 1020, 1030, and 1040 cause the elements described herein (e.g., information, etc.) to be displayed in a user interface on one or more display screens.

Figure 11:
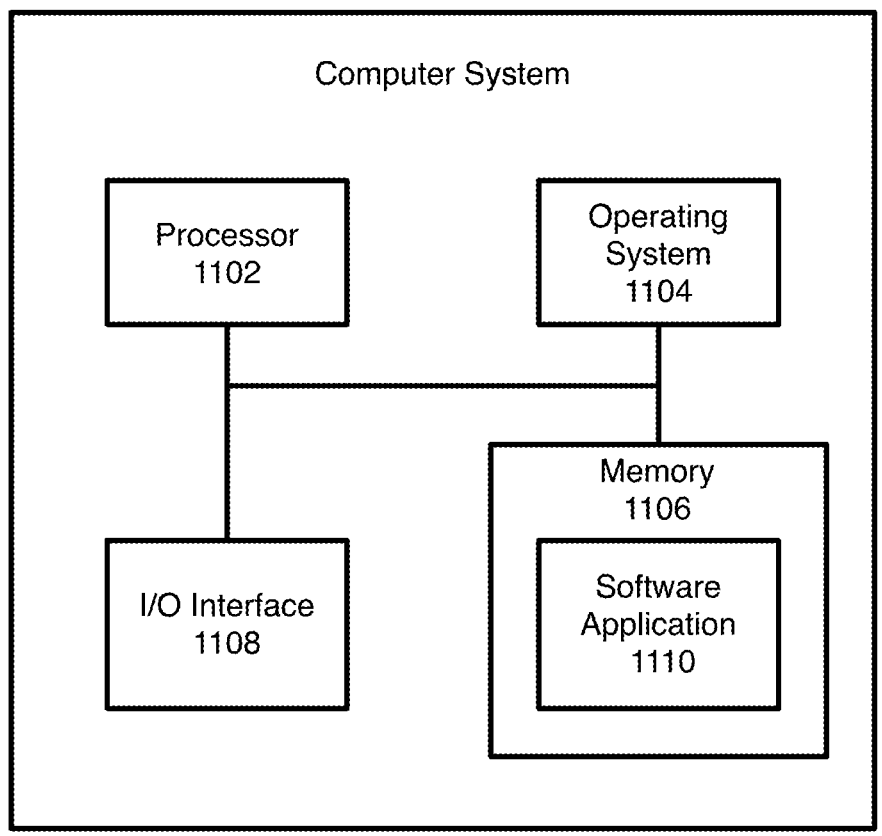
FIG. 11 is a block diagram of an example computer system, which may be used for some implementations described herein.

FIG. 11 is a block diagram of an example computer system 1100, which may be used for some implementations described herein. For example, computer system 1100 may be used to implement server device 1004 of FIG. 10 and/or system 102 of FIG. 1, as well as to perform implementations described herein. In some implementations, computer system 1100 may include a processor 1102, an operating system 1104, a memory 1106, and an input/output (I/O) interface 1108. In various implementations, processor 1102 may be used to implement various functions and features described herein, as well as to perform the method implementations described herein. While processor 1102 is described as performing implementations described herein, any suitable component or combination of components of computer system 1100 or any suitable processor or processors associated with computer system 1100 or any suitable system may perform the steps described. Implementations described herein may be carried out on a user device, on a server, or a combination of both.

Computer system 1100 also includes a software application 1110, which may be stored on memory 1106 or on any other suitable storage location or computer-readable medium. Software application 1110 provides instructions that enable processor 1102 to perform the implementations described herein and other functions. Software application 1110 may also include an engine such as a network engine for performing various functions associated with one or more networks and network communications. The components of computer system 1100 may be implemented by one or more processors or any combination of hardware devices, as well as any combination of hardware, software, firmware, etc.

For ease of illustration, FIG. 11 shows one block for each of processor 1102, operating system 1104, memory 1106, I/O interface 1108, and software application 1110. These blocks 1102, 1104, 1106, 1108, and 1110 may represent multiple processors, operating systems, memories, I/O interfaces, and software applications. In various implementations, computer system 1100 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to cause the one or more processors to perform operations comprising:
   displaying a plurality of random images to a user;
   receiving from the user a selection of at least one target image from the plurality of random images;
   generating a hash number for the at least one target image, wherein the hash number identifies the at least one target image;
   concealing the hash number in the at least one target image, wherein the concealing of the hash number provides security in an authentication of the at least one target image;
   generating an encrypted identification token, wherein the encrypted identification token comprises the hash number;
   associating the encrypted identification token with the user; and
   storing the encrypted identification token in a database for authentication of at least one target image and the user.

2. The system of claim 1, wherein, to conceal the hash number, the logic when executed is further operable to cause the one or more processors to perform operations comprising embedding the hash number in the at least one target image using steganography.

3. The system of claim 1, wherein the logic when executed is further operable to cause the one or more processors to perform operations comprising:
   generating a random number for the at least one target image, wherein a combination of the random number and the hash number identifies the at least one target image; and
   concealing the random number in the at least one target image, wherein the concealing of the random number increases the security in the authentication of the at least one target image, and wherein the encrypted identification token comprises the hash number and the random number.

4. The system of claim 1, wherein the logic when executed is further operable to cause the one or more processors to perform operations comprising receiving a user selection of one or more decoy images from the plurality of random images, wherein the one or more decoy images are grouped with the at least one target image in the authentication of the at least one target image, and wherein the one or more decoy images increase the security in the authentication of the at least one target image.

5. The system of claim 1, wherein, during the authentication of the at least one target image, the logic when executed is further operable to cause the one or more processors to perform operations comprising:
   presenting a group of authentication images to the user, wherein the group of authentication images comprises the at least one target image, one or more decoy images, and a plurality of filler images from the plurality of random images;
   receiving a user selection of the at least one target image from the group of authentication images;
   retrieving the encrypted identification token from the database;
   authenticating the at least one target image based on the encrypted identification token; and
   authenticating the user based on the authenticating of the at least one target image.

6. The system of claim 1, wherein the at least one target image comprises a set of target images selected by the user, wherein the target images in the set conceal respective hash numbers, wherein authentication of the set of target images is based on a predetermined sequence of the target images in the set.

7. The system of claim 1, wherein the at least one target image comprises a set of target images selected by the user, wherein the target images in the set conceal respective hash numbers, wherein authentication of the set of target images is based user selection of the set of target images from a group of authentication images comprising the set of target images, one or more decoy images, and a plurality of filler images from the plurality of random images; and wherein the user selection of the set of target images is based on non-touch selection.

8. The system of claim 1, wherein the at least one target image comprises a set of target images selected by the user, wherein the target images in the set conceal respective hash numbers, wherein authentication of the set of target images is based user selection of the set of target images from a group of authentication images comprising the set of target images, one or more decoy images, and a plurality of filler images from the plurality of random images; and wherein the user selection of the set of target images is based on non-touch selection.

9. A non-transitory computer-readable storage medium with program instructions stored thereon, the program instructions when executed by one or more processors are operable to cause the one or more processors to perform operations comprising:
  displaying a plurality of random images to a user;
  receiving from the user a selection of at least one target image from the plurality of random images;
  generating a hash number for the at least one target image, wherein the hash number identifies the at least one target image;
  concealing the hash number in the at least one target image, wherein the concealing of the hash number provides security in an authentication of the at least one target image;
  generating an encrypted identification token, wherein the encrypted identification token comprises the hash number;
  associating the encrypted identification token with the user; and
  storing the encrypted identification token in a database for authentication of at least one target image and the user.

10. The computer-readable storage medium of claim 9, wherein, to conceal the hash number, the instructions when executed are further operable to cause the one or more processors to perform operations comprising embedding the hash number in the at least one target image using steganography.

11. The computer-readable storage medium of claim 9, wherein the instructions when executed are further operable to cause the one or more processors to perform operations comprising:
  generating a random number for the at least one target image, wherein a combination of the random number and the hash number identifies the at least one target image; and
  concealing the random number in the at least one target image, wherein the concealing of the random number increases the security in the authentication of the at least one target image, and wherein the encrypted identification token comprises the hash number and the random number.

12. The computer-readable storage medium of claim 9, wherein the instructions when executed are further operable to cause the one or more processors to perform operations comprising receiving a user selection of one or more decoy images from the plurality of random images, wherein the one or more decoy images are grouped with the at least one target image in the authentication of the at least one target image, and wherein the one or more decoy images increase the security in the authentication of the at least one target image.

13. The computer-readable storage medium of claim 9, wherein, during the authentication of the at least one target image, the instructions when executed are further operable to cause the one or more processors to perform operations comprising:
  presenting a group of authentication images to the user, wherein the group of authentication images comprises the at least one target image, one or more decoy images, and a plurality of filler images from the plurality of random images;
  receiving a user selection of the at least one target image from the group of authentication images;
  retrieving the encrypted identification token from the database;
  authenticating the at least one target image based on the encrypted identification token; and
  authenticating the user based on the authenticating of the at least one target image.

14. The computer-readable storage medium of claim 9, wherein the at least one target image comprises a set of target images selected by the user, wherein the target images in the set conceal respective hash numbers, wherein authentication of the set of target images is based on a predetermined sequence of the target images in the set.

15. A computer-implemented method comprising:
  displaying a plurality of random images to a user;
  receiving from the user a selection of at least one target image from the plurality of random images;
  generating a hash number for the at least one target image, wherein the hash number identifies the at least one target image;
  concealing the hash number in the at least one target image, wherein the concealing of the hash number provides security in an authentication of the at least one target image;
  generating an encrypted identification token, wherein the encrypted identification token comprises the hash number;
  associating the encrypted identification token with the user; and
  storing the encrypted identification token in a database for authentication of at least one target image and the user.

16. The method of claim 15, wherein, to conceal the hash number, the method further comprises embedding the hash number in the at least one target image using steganography.

17. The method of claim 15, further comprising:
  generating a random number for the at least one target image, wherein a combination of the random number and the hash number identifies the at least one target image; and
  concealing the random number in the at least one target image, wherein the concealing of the random number increases the security in the authentication of the at least one target image, and wherein the encrypted identification token comprises the hash number and the random number.

18. The method of claim 15, where the method further comprises receiving a user selection of one or more decoy images from the plurality of random images, wherein the one or more decoy images are grouped with the at least one target image in the authentication of the at least one target image, and wherein the one or more decoy images increase the security in the authentication of the at least one target image.

19. The method of claim 15, wherein, during the authentication of the at least one target image, the method further comprises:
  presenting a group of authentication images to the user, wherein the group of authentication images comprises the at least one target image, one or more decoy images, and a plurality of filler images from the plurality of random images;
  receiving a user selection of the at least one target image from the group of authentication images;

retrieving the encrypted identification token from the database;
authenticating the at least one target image based on the encrypted identification token; and
authenticating the user based on the authenticating of the at least one target image.

20. The method of claim 15, wherein the at least one target image comprises a set of target images selected by the user, wherein the target images in the set conceal respective hash numbers, wherein authentication of the set of target images is based on a predetermined sequence of the target images in the set.

\* \* \* \* \*